(12) United States Patent
Eastwood et al.

(10) Patent No.: US 10,746,049 B2
(45) Date of Patent: Aug. 18, 2020

(54) GAS TURBINE ENGINE CASE INCLUDING BEARING COMPARTMENT

(71) Applicant: United Technologies Corporation, Farmington, CT (US)

(72) Inventors: Jonathan Jeffery Eastwood, West Hartford, CT (US); Adam Lee Hart, Stuart, FL (US); Brian Levy, Sunny Isles Beach, FL (US); Luis Miguel Ayalde, Weston, FL (US); Brian Craig, Palm Beach Gardens, FL (US); Jose R. Paulino, Saco, ME (US); Esref Yaylagan, Plantation, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 238 days.

(21) Appl. No.: 15/941,041

(22) Filed: Mar. 30, 2018

(65) Prior Publication Data

US 2019/0301302 A1     Oct. 3, 2019

(51) Int. Cl.

| F01D 25/16 | (2006.01) |
|---|---|
| F01D 25/18 | (2006.01) |
| F01D 25/24 | (2006.01) |
| F01D 9/06 | (2006.01) |

(52) U.S. Cl.
CPC .......... *F01D 25/162* (2013.01); *F01D 9/065* (2013.01); *F01D 25/16* (2013.01); *F01D 25/18* (2013.01); *F01D 25/183* (2013.01); *F01D 25/24* (2013.01); *F05D 2240/50* (2013.01)

(58) Field of Classification Search
CPC ........ F01D 25/16; F01D 25/162; F01D 25/18; F01D 25/183; F01D 25/24; F01D 9/065; F05D 2240/50
See application file for complete search history.

(56) References Cited

U.S. PATENT DOCUMENTS

| 5,080,555 A * | 1/1992 | Kempinger ............. F01D 9/065 415/108 |
| 8,177,488 B2 * | 5/2012 | Manteiga ................ F01D 9/065 415/108 |
| 8,408,011 B2 * | 4/2013 | Fontaine ............... F01D 25/162 228/101 |

(Continued)

FOREIGN PATENT DOCUMENTS

EP     2192273 A2     6/2010

OTHER PUBLICATIONS

Partial European Search Report for European Application No. 19166660.1 completed Jul. 31, 2019.

*Primary Examiner* — Brian P Wolcott
(74) *Attorney, Agent, or Firm* — Carlson, Gaskey & Olds, P.C.

(57) ABSTRACT

An example case for a gas turbine engine includes a bearing compartment, a radially outer ring, and a radially inner ring. The radially outer ring and radially inner ring are connected by a plurality of circumferentially spaced apart struts and define an annular flow path therebetween. The radially inner ring includes a first flange that extends radially outward from the bearing compartment. The first flange includes an undulation that extends axially away from the plurality of struts, and defines a load path between the bearing compartment and the radially outer ring.

20 Claims, 7 Drawing Sheets

(56) References Cited

U.S. PATENT DOCUMENTS

| | | | | |
|---|---|---|---|---|
| 9,476,320 | B2* | 10/2016 | Savela | F01D 25/164 |
| 2009/0101787 | A1* | 4/2009 | Dierberger | F01D 25/162 |
| | | | | 248/554 |
| 2009/0246018 | A1* | 10/2009 | Kondo | F01D 25/164 |
| | | | | 415/229 |
| 2010/0275614 | A1 | 11/2010 | Fontaine et al. | |
| 2015/0285098 | A1* | 10/2015 | De Sousa | F01D 9/04 |
| | | | | 415/214.1 |
| 2016/0032780 | A1 | 2/2016 | Grogg et al. | |

* cited by examiner

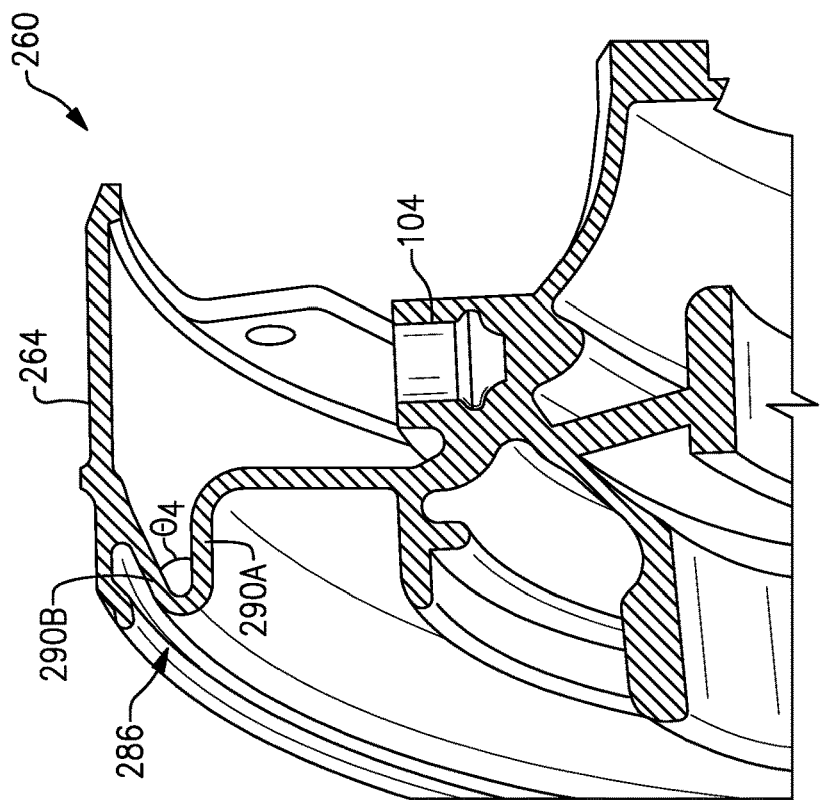
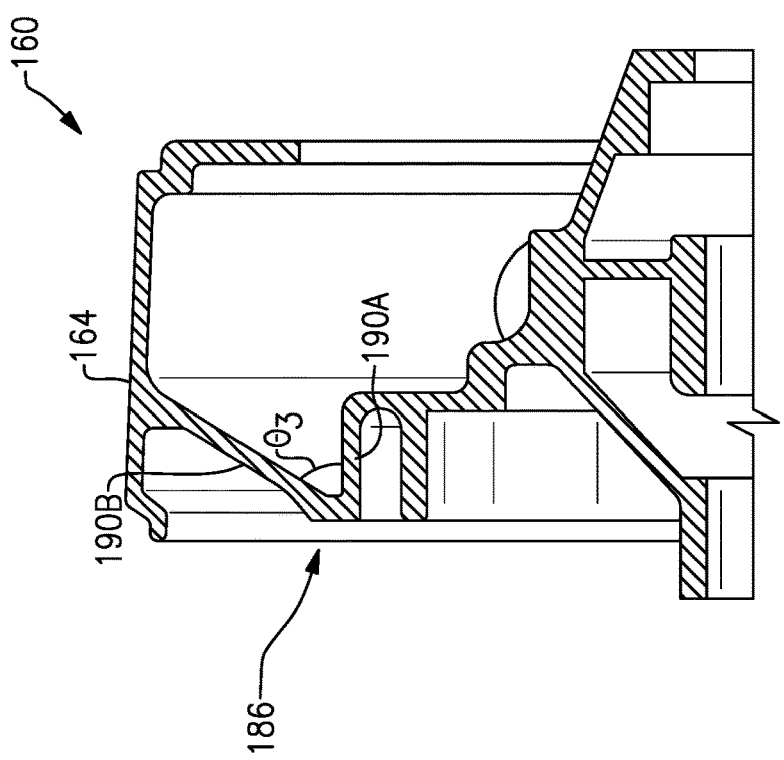

US 10,746,049 B2

GAS TURBINE ENGINE CASE INCLUDING BEARING COMPARTMENT

STATEMENT REGARDING FEDERALLY SPONSORED RESEARCH OR DEVELOPMENT

This invention was made with Government support under Contract No. W58RGZ-16-C-0046, awarded by the United States Army. The Government has certain rights in this invention.

BACKGROUND

This application relates to engine cases, and more particularly to an engine case that includes a bearing compartment.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Gas turbine engines typically include a turbine exhaust case that guides exhaust flow from the turbine section. The turbine exhaust case can have two rings defining inner and outer boundaries to guide the exhaust flow exiting the engine. The rings can be interconnected by struts to support the inner ring.

SUMMARY

A case for a gas turbine engine according to an example of the present disclosure includes a bearing compartment, a radially outer ring, and a radially inner ring. The radially outer ring and radially inner ring are connected by a plurality of circumferentially spaced apart struts and define an annular flow path therebetween. The radially inner ring includes a first flange that extends radially outward from the bearing compartment. The first flange includes an undulation that extends axially away from the plurality of struts, and defines a load path between the bearing compartment and the radially outer ring.

In a further embodiment of any of the foregoing embodiments, the case includes a plurality of oil lines, and each oil line is disposed within a respective one of the plurality of struts and is in fluid communication with the bearing compartment.

In a further embodiment of any of the foregoing embodiments, the radially inner ring includes a second flange that extends radially inward towards the bearing compartment, the plurality of struts are at least partially disposed between the first and second flanges, and the second flange moves freely relative to the bearing compartment.

In a further embodiment of any of the foregoing embodiments, the case is a turbine exhaust case and the second flange is aft of the first flange and is mounted to a heat shield that encloses an aft side of the bearing compartment.

In a further embodiment of any of the foregoing embodiments, the first flange is at least partially axially forward of the plurality of struts, and the second flange is at least partially axially aft of the plurality of struts.

In a further embodiment of any of the foregoing embodiments, the first flange includes a radially extending portion disposed between the undulation and the bearing compartment, and an apex of the undulation is axially forward of the radially extending portion.

In a further embodiment of any of the foregoing embodiments, the undulation includes first and second undulation portions; the first undulation portion meets the radially extending portion at a first bend having a first radius of curvature, and extends with at least a component in an axial direction from the bend to the apex; the first and second undulation portions meet at the apex at a second bend having a second radius of curvature that is less than the first radius of curvature; and the second undulation portion extends with at least a component in an axial direction from the bend towards to the radially extending portion.

In a further embodiment of any of the foregoing embodiments, the first flange is at least partially axially aft of the plurality of struts, the second flange is at least partially axially forward of the plurality of struts, the first flange includes a radially extending portion that extends between the undulation and the bearing compartment, and an apex of the undulation is axially aft of the radially extending portion.

In a further embodiment of any of the foregoing embodiments, the radially inner ring includes a second flange that extends radially outward from the bearing compartment, the plurality of struts are at least partially disposed between the first and second flanges, and the second flange includes an undulation that extends axially away from the plurality of struts and defines an additional load path between the bearing compartment and the radially outer ring.

In a further embodiment of any of the foregoing embodiments, the first flange is integrally formed with the bearing compartment.

A case for a gas turbine engine according to an example of the present disclosure includes a bearing compartment. A radially outer ring and a radially inner ring are connected by a plurality of circumferentially spaced apart struts and define an annular flow path therebetween. The radially inner ring includes a first flange that extends radially outward from the bearing compartment and a second flange that moves freely relative to the bearing compartment, and the plurality of struts are at least partially disposed between the first and second flanges.

A gas turbine engine according to an example of the present disclosure includes a core engine configured to compress and communicate airflow from a core flow path into a combustor section for expansion through a turbine section, and a case. The case includes a bearing compartment, and a radially outer ring and a radially inner ring connected by a plurality of circumferentially spaced apart struts and define a portion of the core flow path therebetween. The radially inner ring includes a first flange that extends radially outward from the bearing compartment. The first flange includes an undulation that extends axially away from the plurality of struts, and defines a load path between the bearing compartment and the radially outer ring.

In a further embodiment of any of the foregoing embodiments, the gas turbine engine includes a plurality of oil lines, each disposed within a respective one of the plurality of struts, and a lubrication system is in fluid communication with the bearing compartment through the plurality of oil lines.

In a further embodiment of any of the foregoing embodiments, the radially inner ring includes a second flange that extends radially inward towards the bearing compartment, the plurality of struts at least partially disposed between the first and second flanges, and the second flange moves freely relative to the bearing compartment.

In a further embodiment of any of the foregoing embodiments, the first flange is one of at least partially axially forward of the plurality of struts and at least partially axially aft of the plurality of struts, and the second flange is the other of at least partially axially forward of the plurality of struts and at least partially axially aft of the plurality of struts.

In a further embodiment of any of the foregoing embodiments, the case is a turbine exhaust case and the second flange is aft of the first flange and is mounted to a heat shield that encloses an aft side of the bearing compartment.

In a further embodiment of any of the foregoing embodiments, the first flange includes a radially extending portion disposed between the undulation and the bearing compartment, and an apex of the undulation is spaced axially away from the radially extending portion and the plurality of struts.

In a further embodiment of any of the foregoing embodiments, the undulation includes first and second portions that meet at the apex, the first portion extends between the apex and the radially extending portion and is approximately parallel to a central longitudinal axis of the gas turbine engine, and the first and second portions are acutely angled with respect to each other.

In a further embodiment of any of the foregoing embodiments, the radially inner ring includes a second flange that extends radially outward from the bearing compartment, the plurality of struts are at least partially disposed between the first and second flanges, and the second flange includes an undulation that extends axially away from the plurality of struts and defines an additional load path between the bearing compartment and the radially outer ring.

In a further embodiment of any of the foregoing embodiments, the bearing compartment includes at least one first bearing that supports a high pressure spool, and at least one second bearing that supports a low pressure spool, and the high and low pressure spools rotate about a common axis.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 5A is a view of an example flange that can be used in the case of FIGS. 3-4.
FIG. 5B is a view of another example flange that can be used in the case of FIGS. 3-4.

DETAILED DESCRIPTION

Figure 1:
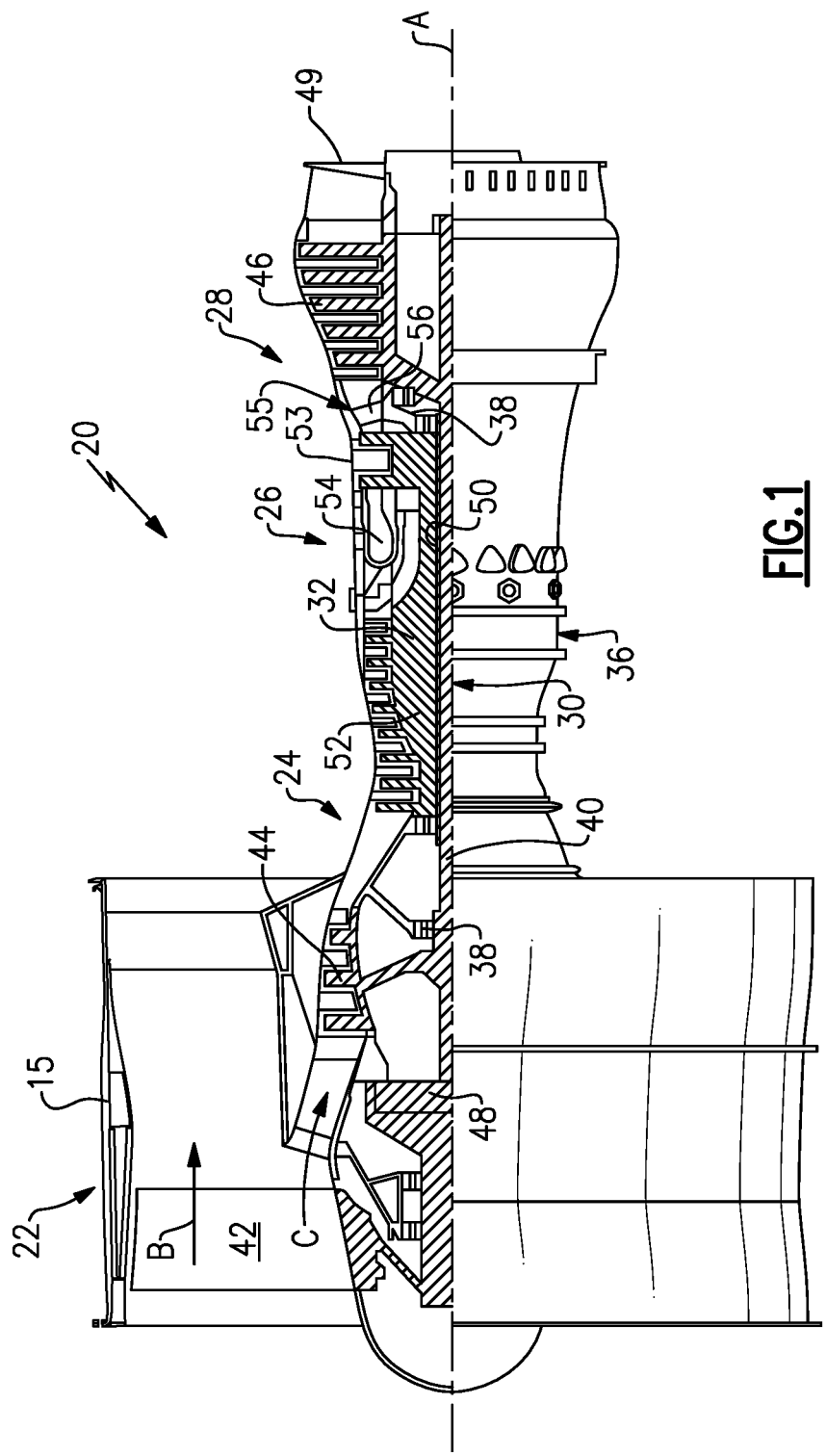
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 53. A combustor 54 is arranged in exemplary gas turbine 20 between the high pressure compressor 52 and the high pressure turbine 53. A mid-turbine frame 55 of the engine static structure 36 is arranged generally between the high pressure turbine 53 and the low pressure turbine 46. Aft of the low pressure turbine 46 is a turbine exhaust case 49. The mid-turbine frame 55 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 54, then expanded over the high pressure turbine 53 and low pressure turbine 46. The mid-turbine frame 55 includes airfoils 56 which are in the core airflow path C. The turbines 46, 53 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
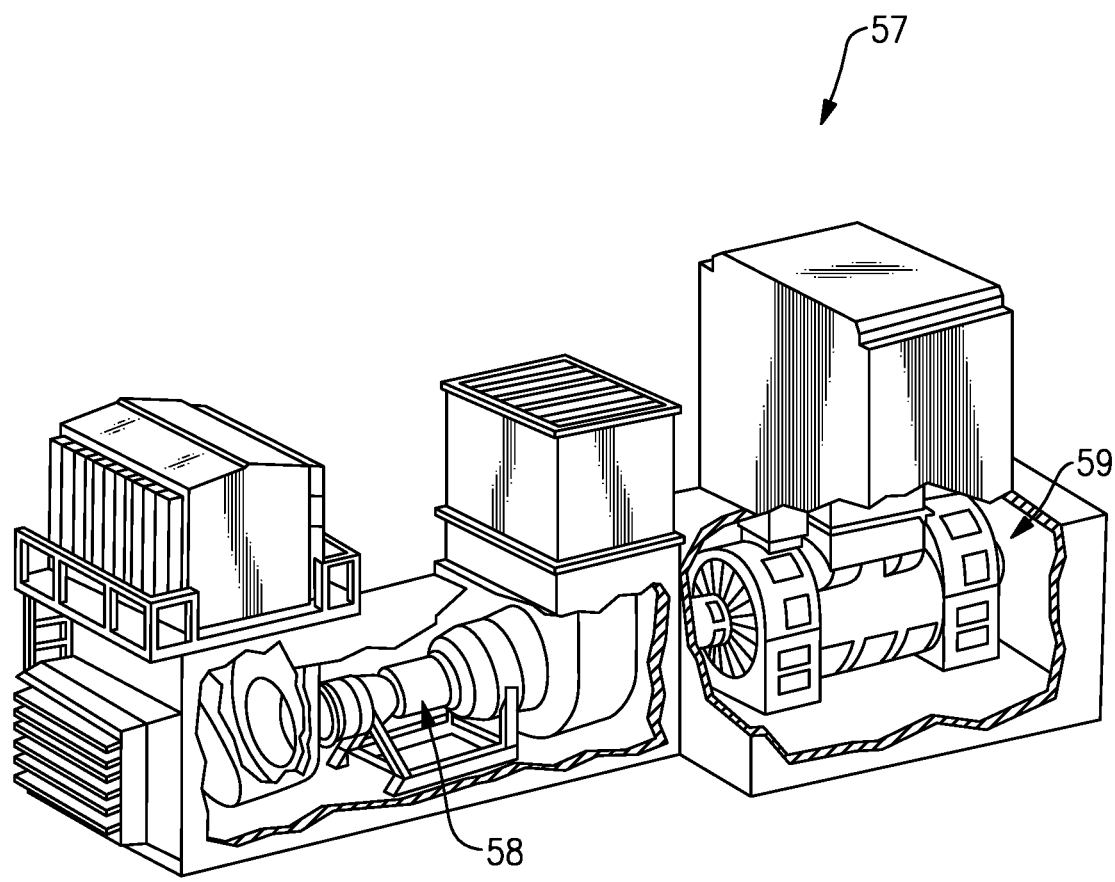
FIG. 2 is a schematic view of an example power turbine.

Referring now to FIG. 2, an example industrial gas turbine engine assembly 57 includes a gas turbine engine 58 that is mounted to a structural land-based frame to drive a generator 59. The example gas turbine engine 58 includes many of the same features described in the gas turbine engine 20 illustrated in FIG. 1 and operates in much the same way. The land-based industrial gas turbine engine 58, however, may include additional features such as a shaft to drive the generator 59 and is not constrained by the same weight restrictions that apply to an aircraft mounted gas turbine engine 20. In addition, the example gas turbine engine 58 does not include a fan.

Figure 3:
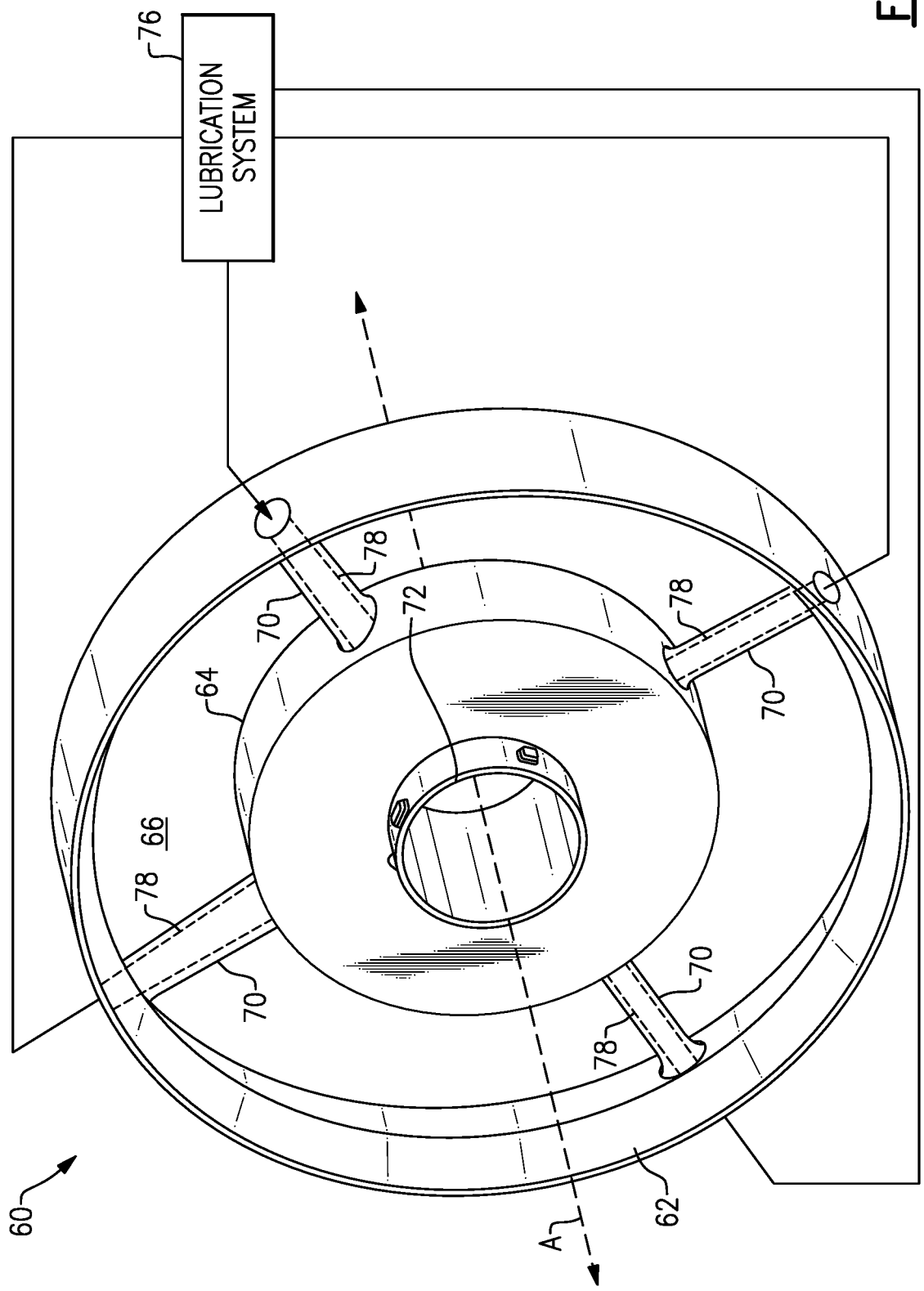
FIG. 3 is a first, schematic view of an example case for a gas turbine engine.

FIG. 3 is a first, schematic view of an example case 60 for a turbine engine, such as the gas turbine engine 20 or the gas turbine engine 58. In the illustrated embodiment, the case 60 is a turbine exhaust case, which can be utilized for the turbine exhaust case 49 in FIG. 1. Although the disclosure primarily refers to the case 60 with respect to a turbine exhaust case, other applications can benefit from the teachings herein, including rows of stators, vanes, and seals at multiple locations in an engine. For example, the case 60 can be a mid-turbine frame such as the mid-turbine frame 55 of FIG. 1.

The case 60 includes a radially outer ring 62 extending at least partially about a radially inner ring 64. The rings 62, 64 define an annular flow path 66 that can be used as a portion of the core flow path C. The annular flow path 66 extends along the central longitudinal axis A.

The radially inner ring 64 is supported relative to the outer ring 62 by a plurality of circumferentially spaced apart struts 70. A bearing compartment 72 is disposed radially inward of the radially inner ring 64.

In the example of FIG. 3, each of the struts 70 is hollow and a respective oil line 78 is disposed in each of the struts 70. The oil lines 78 provide for fluid communication between a lubrication system 76 and the bearing compartment 72. At least one of the oil lines 78 provides for oil delivery from the lubrication system 76 to the bearing compartment 72, and at least one of the oil lines 78 provides for oil removal from the bearing compartment 72 to the lubrication system 76. Although four struts are shown in FIG. 3, it is understood that other quantities of struts 70 and oil lines 78 could be included (e.g., five or six struts, each with its own oil line).

Figure 4B:
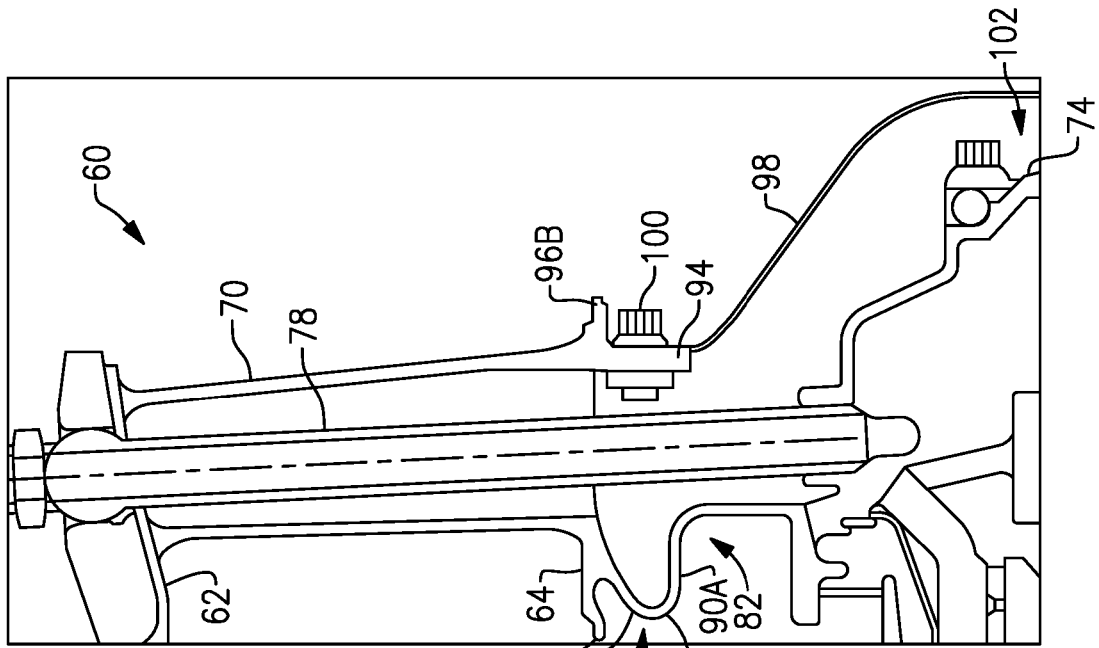
FIG. 4B is a third view of the example case of FIG. 3.
Figure 4A:
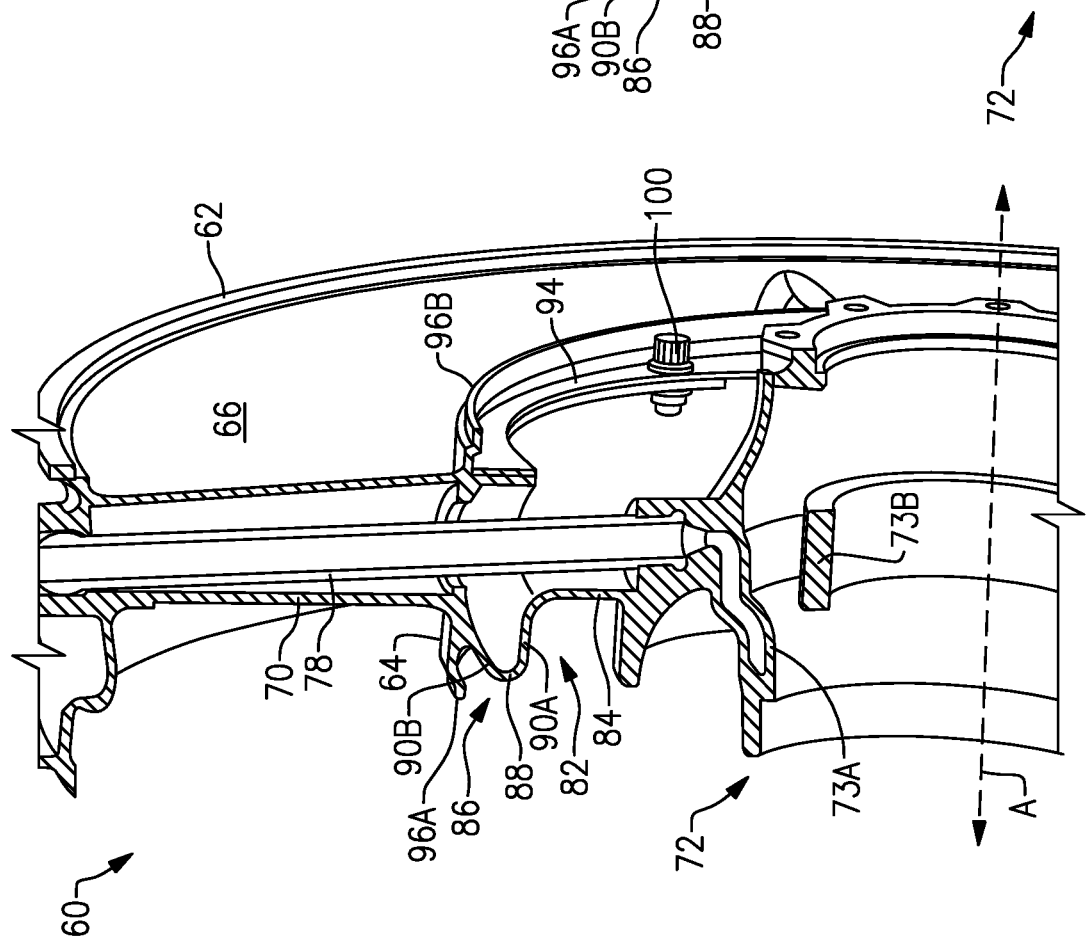
FIG. 4A is a second view of the example case of FIG. 3.

FIG. 4A is a second view of the example case 60 of FIG. 3. As shown in FIG. 4A, the radially inner ring 64 includes a first flange 82 that extends radially outward from the bearing compartment 72, and a second flange 94 that extends radially inward towards the bearing compartment 72. The plurality of struts 70 are at least partially disposed between the first flange 82 and second flange 94. In the example of FIG. 3, the second flange 94 can move freely relative to the bearing compartment 72 because there is not an additional connection between the second flange 94 and the bearing compartment 72. The radially inner ring 64 extends axially between opposing first and second ends 96A, 96B. In the example of FIGS. 3 and 4A, the first end 96A is axially forward of the apex 88, and the second end 96B is axially aft of the second flange 94.

The bearing compartment 72 includes a first roller bearing 73A that supports the outer shaft 50 of the high speed spool 32 and a second roller bearing 73B that supports the inner shaft 40 of the low speed spool 30.

Referring now to FIG. 4B, with continued reference to FIGS. 3 and 4A, the bearing compartment 72 contains oil from the lubrication system 76 and is sealed from other parts of the gas turbine engine 20. The seal is provided in part by a rear cover 74 shown in FIG. 4B.

A heat shield 98 is mounted to the second flange 94 using a plurality of fasteners 100 (one of which is shown in FIGS. 4A-B) that are circumferentially spaced apart from each other. The heat shield 98 encloses an aft end 102 of the bearing compartment 72 to shield the bearing compartment 72 from the high temperature combustion byproducts exiting the turbine annular flow path 66.

The first flange 82 includes a radial portion 84 and an undulation 86. The undulation 86 includes first and second undulation portions 90A-B that meet at an apex 88 that is axially forward of the radial portion 84. The undulation 86 defines a load path between the bearing compartment 72 and the radially outer ring 62. The undulation 86 provides a reduced radially stiffness in the first flange 82 than would be provided without the undulation 86, because the undulation portions 90A-B can radially flex towards and away from one another. In one example, the undulation 86 also provides for a limited amount of axial flexing.

Figure 4C:
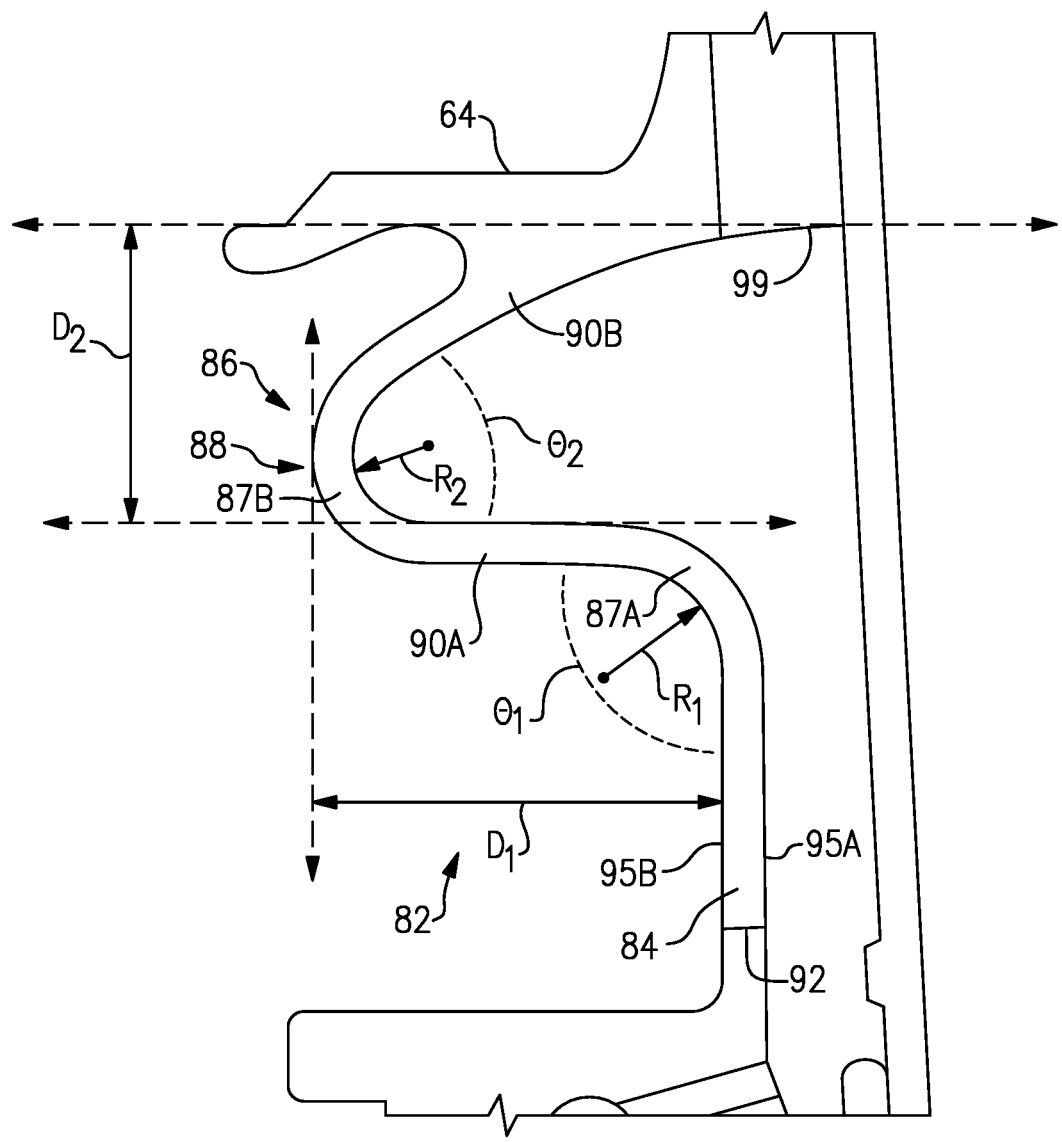
FIG. 4C is an enlarged view of a portion of FIG. 4B.

FIG. 4C is an enlarged portion of FIG. 4B that includes additional details about the first flange 82 and undulation 86. As shown in FIG. 4C, the first undulation portion 90A meets the radial portion 86 at a bend 87A and extends with at least a component in an axial direction from the bend 87 to another bend 87B at apex 88. The second undulation portion 90B extends with at least a component in an axial direction from the apex 88 towards to the radial portion 86, and at least a component in a radial direction from the apex 88 towards the radially outer ring 62. The undulation 86 provides a "windback" feature for the first flange 82. In one example, the radial portion 84 is approximately perpendicular to the central longitudinal axis A.

The first undulation portion 90A and the radial portion 84 are angled with respect to one another at an angle $\theta_1$, and the first and second undulation portions 90A-B are acutely angled with respect to one another at an angle $\theta_2$. In the example of FIG. 4C, and angle $\theta_1$ is approximately 90° and angle $\theta_2$ is approximately 33°. In one example neither of $\theta_1$ and $\theta_2$ is greater than 180°.

The bend 87A has a radius of curvature $R_1$, and the bend 87B has a radius of curvature $R_2$. In the example of FIG. 4C, $R_1$ is greater than $R_2$.

The first flange 82 has an inner surface 95A and an outer surface 95B. The inner surface 95A is aft of the outer surface 95B. A distance D1 spans from the outer surface 95B of the radial portion 84 to the outer surface 95B of the apex 88, and a distance D2 spans from the inner surface of the first undulation portion 90A to a radially outermost point 99 of the inner surface 95A of the second undulation portion 90B. In one example, a ratio of $R_1/D_1$ is 0.05-1, and a ratio of $R_2/D_2$ is 0.05-1. In on example, a ratio of $D_1/D_2$ is 0.05-15.

In the example of FIG. 4C, the first flange 82 is welded to the bearing compartment at a location 92. In another example, the first flange 82 joins the bearing compartment 72 during manufacture by being integrally formed with the bearing compartment 72 during casting.

The undulation 86 defines a load path between the bearing compartment 72 and the radially outer ring 62. The undulation 86 provides a reduced radially stiffness in the first flange 82 than would be provided without the undulation 86, because the undulation portions 90A-B can radially flex towards and away from one another. In one example, the undulation 86 also provides for a limited amount of axial flexing.

Because of the load path provided by the undulation 86, and the free movement that is permitted between the second flange 94 and bearing compartment 72, the undulation 86 defines a primary load path between the bearing compartment 72 and radially outer ring 62.

Some degree of radial flexing can be useful for thermal expansion and to reduce a stress applied to the case 60. Thermal expansion may occur, e.g., due to a thermal mismatch between the annular flow path 66 and the bearing compartment 72. However, excessive radial flexing can increase radial deflections of turbine blades in the low pressure turbine 46, which can affect a running clearance between turbine blade tips of the low pressure turbine 46 and blade outer air seals.

A desired degree of radial stiffness of the first flange 82 can be achieved by manipulating the thickness of the undulation 86, the angles $\theta_1$ and $\theta_2$, and the radii of curvature $R_1$ and $R_2$. In general, the closer the second undulation portion 90B is to being perpendicular to the central longitudinal axis A, the stiffer the undulation 86 becomes. Also, in general, increased thickness of the undulation 86 provides for a greater degree of radial stiffness. Also, in general, a smaller radius of curvature at one of the bends 87 would provide for a higher stress concentration at the bend 87, and also a greater degree of radial stiffness. The undulation 86 can be designed with an appropriate thickness, angles $\theta_1$ and $\theta_2$, and radii of curvature $R_1$ and $R_2$ to meet both the stiffness and structural requirements of the case 60.

In the example of FIGS. 3 and 4A, the radially inner ring 64 is free of any attachment to the bearing compartment 72 aft of the plurality of the struts 70. It has been proposed to attach the radially inner ring 64 of a turbine exhaust case 49 to a bearing compartment 72 both forward and aft of struts 70. Omitting an attachment aft of the struts 70, as shown in FIGS. 3-4, provides for a weight reduction, and enables the undulation 86 to control the radial stiffness of the radially inner ring 64 to a greater degree.

In this disclosure, like reference numerals designate like elements where appropriate and reference numerals with the addition of one-hundred or multiples thereof designate modified elements that are understood to incorporate the same features and benefits of the corresponding elements.

FIG. 5A shows an example case 160 which uses an undulation 186 having a different profile than the undulation 86 of FIG. 4. In FIG. 5A, the undulation portions 190A-B are angled away from each other at an angle $\theta_3$ of approximately 60°.

FIG. 5B shows an example case 260 which uses an undulation 286 having a different profile than the undulations 86, 186. In FIG. 5B, the undulation portions 290A-B are angled away from each other at an angle $\theta_4$ of approximately 28°. FIG. 5B also shows a receptacle 104 into which an oil line 78 can be threaded.

Figure 6:
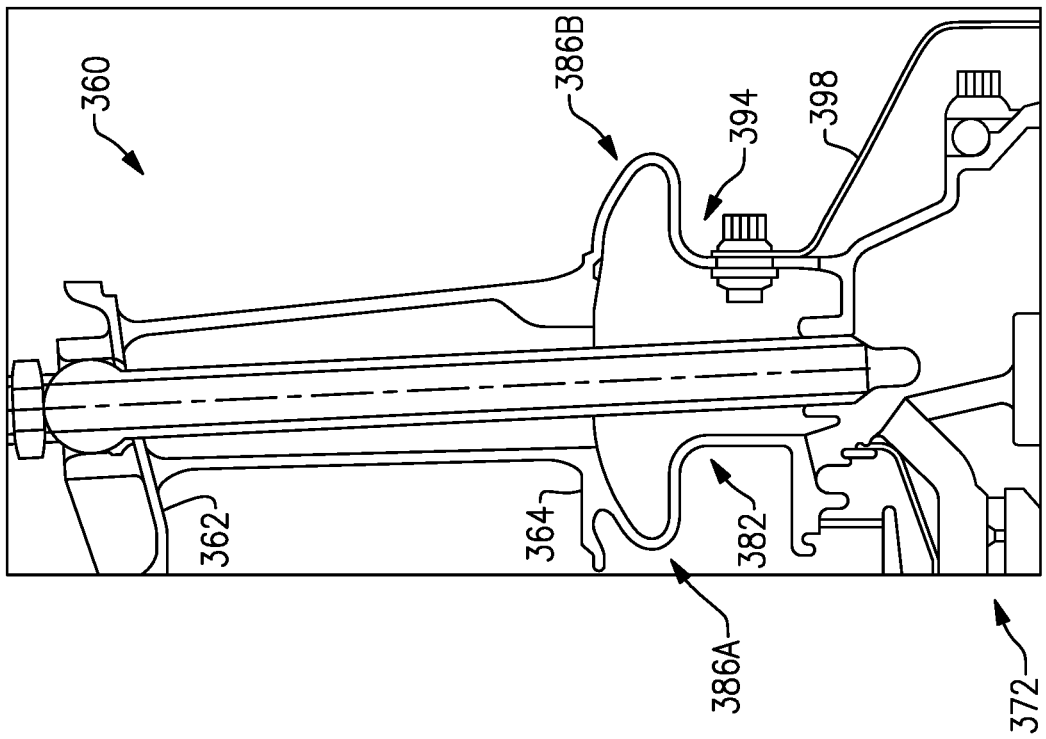
FIG. 6 is a schematic view of another example case for a gas turbine engine.

FIG. 6 is a schematic view of another example case 360 for a gas turbine engine in which the first flange 382 and the second flange 394 of the radially inner ring 364 each include a respective undulation 386A-B, and both of the first flange 382 and second flange 394 provide a load path between the bearing compartment 372 and the radially outer ring 362. The heat shield 398 is fastened to the second flange 394 radially inward of the undulation 386B.

Figure 7:
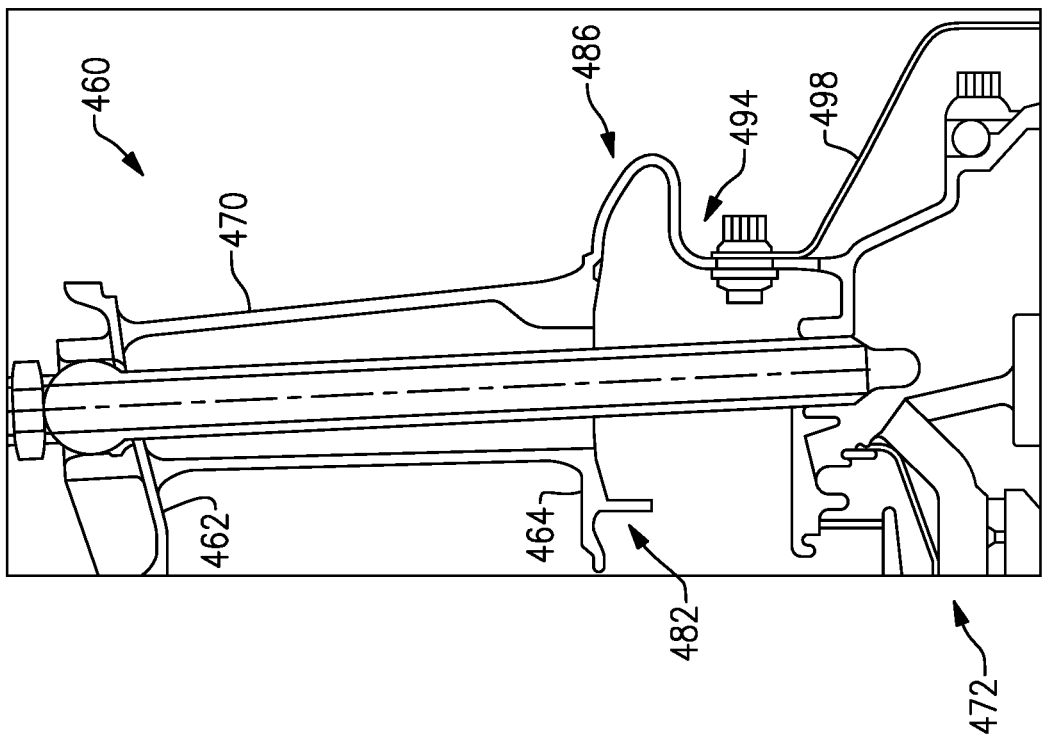
FIG. 7 is a schematic view of another example case for a gas turbine engine.

FIG. 7 is a schematic view of another example case 460 for a gas turbine engine in which the second flange 494 includes an undulation 486 and defines a load path between the bearing compartment 472 and the radially outer ring 462, and the first flange 482 lacks an undulation. In this example, the first flange 482 can move freely relative to the bearing compartment 472 because the radially inner ring 464 is free of any attachment to the bearing compartment 472 fore of the plurality of struts 470.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A case for a gas turbine engine, comprising:
    a bearing compartment; and
    a radially outer ring and a radially inner ring connected by a plurality of circumferentially spaced apart struts and defining an annular flow path therebetween;
    the radially inner ring comprising a first flange that extends radially outward from the bearing compartment, the first flange comprising an undulation that extends axially away from the plurality of struts, and defining a load path between the bearing compartment and the radially outer ring, the undulation including first and second undulation portions;
    wherein the first undulation portion meets the radially extending portion at a first bend having a first radius of curvature, and extends with at least a component in an axial direction from the first bend to the apex;
    wherein the first and second undulation portions meet at the apex at a second bend having a second radius of curvature that is less than the first radius of curvature; and
    wherein the second undulation portion extends with at least a component in an axial direction from the second bend towards to the radially extending portion.

2. The case of claim 1, comprising a plurality of oil lines, each oil line disposed within a respective one of the plurality of struts and in fluid communication with the bearing compartment.

3. The case of claim 1, wherein the radially inner ring comprises a second flange that extends radially inward towards the bearing compartment, the plurality of struts are at least partially disposed between the first and second flanges, and the second flange moves freely relative to the bearing compartment.

4. The case of claim 3, wherein the case is a turbine exhaust case and the second flange is aft of the first flange and is mounted to a heat shield that encloses an aft side of the bearing compartment.

5. The case of claim 3, wherein the first flange is at least partially axially forward of the plurality of struts, and the second flange is at least partially axially aft of the plurality of struts.

6. The case of claim 5, wherein the first flange includes a radially extending portion disposed between the undulation and the bearing compartment, and an apex of the undulation is axially forward of the radially extending portion.

7. The case of claim 3, wherein:
the first flange is at least partially axially aft of the plurality of struts;
the second flange is at least partially axially forward of the plurality of struts;
the first flange includes a radially extending portion that extends between the undulation and the bearing compartment; and
an apex of the undulation is axially aft of the radially extending portion.

8. The case of claim 1, wherein the radially inner ring comprises a second flange that extends radially outward from the bearing compartment, the plurality of struts at least partially disposed between the first and second flanges, the second flange comprising an undulation that extends axially away from the plurality of struts and defining an additional load path between the bearing compartment and the radially outer ring.

9. The case of claim 1, wherein the first flange is integrally formed with the bearing compartment.

10. A gas turbine engine, comprising:
a core engine configured to compress and communicate airflow from a core flow path into a combustor section for expansion through a turbine section; and
a case comprising:
a bearing compartment; and
a radially outer ring and a radially inner ring connected by a plurality of circumferentially spaced apart struts and defining a portion of the core flow path therebetween;
the radially inner ring comprising a first flange that extends radially outward from the bearing compartment, the first flange comprising an undulation that extends axially away from the plurality of struts, and defining a load path between the bearing compartment and the radially outer ring, the undulation including first and second undulation portions;
wherein the first undulation portion meets the radially extending portion at a first bend having a first radius of curvature, and extends with at least a component in an axial direction from the first bend to the apex;
wherein the first and second undulation portions meet at the apex at a second bend having a second radius of curvature that is less than the first radius of curvature; and
wherein the second undulation portion extends with at least a component in an axial direction from the second bend towards to the radially extending portion.

11. The gas turbine engine of claim 10, comprising:
a plurality of oil lines, each oil line disposed within a respective one of the plurality of struts; and
a lubrication system in fluid communication with the bearing compartment through the plurality of oil lines.

12. The gas turbine engine of claim 10, wherein the radially inner ring comprises a second flange that extends radially inward towards the bearing compartment, the plurality of struts at least partially disposed between the first and second flanges, and the second flange moves freely relative to the bearing compartment.

13. The gas turbine engine of claim 10, wherein the first flange is one of at least partially axially forward of the plurality of struts and at least partially axially aft of the plurality of struts, and the second flange is the other of at least partially axially forward of the plurality of struts and at least partially axially aft of the plurality of struts.

14. The gas turbine engine of claim 13, wherein the case is a turbine exhaust case and the second flange is aft of the first flange and is mounted to a heat shield that encloses an aft side of the bearing compartment.

15. The gas turbine engine of claim 13, wherein the first flange includes a radially extending portion disposed between the undulation and the bearing compartment, and an apex of the undulation is spaced axially away from the radially extending portion and the plurality of struts.

16. The gas turbine engine of claim 15, wherein the undulation comprises first and second portions that meet at the apex, the first portion extends between the apex and the radially extending portion and is approximately parallel to a central longitudinal axis of the gas turbine engine, and the first and second portions are acutely angled with respect to each other.

17. The gas turbine engine of claim 10, wherein the radially inner ring comprises a second flange that extends radially outward from the bearing compartment, the plurality of struts at least partially disposed between the first and second flanges, and the second flange comprising an undulation that extends axially away from the plurality of struts and defines an additional load path between the bearing compartment and the radially outer ring.

18. The gas turbine engine of claim 10, wherein the bearing compartment comprises:
at least one first bearing that supports a high pressure spool; and
at least one second bearing that supports a low pressure spool;
wherein the high and low pressure spools rotate about a common axis.

19. A case for a gas turbine engine, comprising:
a bearing compartment; and
a radially outer ring and a radially inner ring connected by a plurality of circumferentially spaced apart struts and defining an annular flow path therebetween;
the radially inner ring comprising a first flange that extends radially outward from the bearing compartment, the first flange comprising an undulation that extends axially away from the plurality of struts, and defining a load path between the bearing compartment and the radially outer ring; and
a second flange that extends radially inward towards the bearing compartment, wherein the plurality of struts are at least partially disposed between the first and second flanges, and the second flange moves freely relative to the bearing compartment;
wherein:
the first flange is at least partially axially aft of the plurality of struts;
the second flange is at least partially axially forward of the plurality of struts;

the first flange includes a radially extending portion that extends between the undulation and the bearing compartment; and an apex of the undulation is axially aft of the radially extending portion.

20. A case for a gas turbine engine, comprising:

a bearing compartment; and a radially outer ring and a radially inner ring connected by a plurality of circumferentially spaced apart struts and defining an annular flow path therebetween;

the radially inner ring comprising a first flange that extends radially outward from the bearing compartment, the first flange comprising an undulation that extends axially away from the plurality of struts, and defining a load path between the bearing compartment and the radially outer ring;

wherein the radially inner ring comprises a second flange that extends radially outward from the bearing compartment, the plurality of struts at least partially disposed between the first and second flanges, the second flange comprising an undulation that extends axially away from the plurality of struts and defining an additional load path between the bearing compartment and the radially outer ring.

\* \* \* \* \*